United States Patent Office 3,248,182
Patented Apr. 26, 1966

3,248,182
CRYSTALLIZATION OF SODIUM SESQUICARBONATE IN PRESENCE OF A SURFACTANT AND A HYDROCARBON OIL
John F. Herink, Rock Springs, and Richard W. Waggener, Green River, Wyo., assignors, by mesne assignments, to Intermountain Research & Development Corporation, Cheyenne, Wyo., a corporation of Wyoming
No Drawing. Filed Nov. 21, 1962, Ser. No. 239,345
19 Claims. (Cl. 23—300)

The invention relates to an improved method of growing sodium sesquicarbonate crystals in the presence of a mixture of an anionic, organic surfactant and an aliphatic hydrocarbon oil having a boiling point between 80° and 450° C.

Large underground deposits of trona which is mostly sodium sesquicarbonate ($Na_2CO_3 \cdot NaHCO_3 \cdot 2H_2O$) are found in Sweetwater County and adjacent counties in Wyoming and various other areas around the world. The trona deposits in Sweetwater County are found in depths ranging from 800 to 2500 feet undergood and consist of a main bed of trona varying from 8 to 18 feet in thickness and other beds of smaller varying thicknesses separated by shale beds. The crude mined trona contains about 90 to 95% sodium sesquicarbonate and about 5 to 10% impurities.

Sodium sequicarbonate may be recovered from crude trona by a variety of processes which basically involve dissolving crude trona in an aqueous solvent such as water or recycled mother liquor, clarifying the resulting solution to remove insolubles and crystallizing sodium sesquicarbonate from the clarified solution. The sodium sesquicarbonate crystals are then calcined to form soda ash which is a valuable commercial product.

The sodium sesquicarbonate crystals produced by these prior art processes were of inferior quality in crystal size, uniformity, shape and bulk density which affected their dewaterability, settling rate and resistance to breakage. They were usually long, thin crystals. These inferior crystals of sodium sesquicarbonate led to an inferior soda ash which had a low bulk density and a high amount of fines.

Improved crystals of sodium sesquicarbonate have been obtained by Bauer et al. in U.S. Patent No. 2,954,282 by effecting the crystallization of sodium sesquicarbonate in the presence of about 5 to about 100 p.p.m. of an anionic organic surfactant such as alkyl benzene sulfonates having at least 8 alkyl carbon atoms, alkyl naphthalene sulfonates containing at least 4 alkyl carbon atoms, primary alkyl sulfonates having at least 8 carbon atoms, or N-acylated taurines. The crystals produced by this process have an improved size, dewaterability and settling rate.

It is an object of the invention to provide an improved process for obtaining sodium sesquicarbonate crystals of high bulk density and a high percentage of +100 mesh crystals.

It is another object of the invention to provide sodium sesquicarbonate crystals of high bulk density and a high percentage of +100 mesh crystals in a simple, economical manner.

These and other objects and advantages of the invention will become obvious from the following detailed description.

The process of the invention for preparing sodium sesquicarbonate crystals of high bulk density and having a high percentage of +100 mesh crystals comprises crystallizing sodium sesquicarbonate from a saturated aqueous trona solution in the presence of about 5 to about 400 parts per million of a mixture of an anionic organic surfactant capable of adsorbing on sodium sesquicarbonate crystals and a hydrocarbon oil having a boiling point of about 80° to about 450° C., the ratio of surfactant to oil being from about 1:1 to 20:1, preferably 2:1 to 4:1 and recovering the sodium sesquicarbonate crystals.

During recent research we discovered that the effect of the anionic organic surfactants used in U.S. Patent No. 2,954,282 was substantially increased when an oil was added to the trona solutions containing the anionic surfactant. The mixture of an anionic organic surfactant and an oil in the crystallizing solution gives sodium sesquicarbonate crystals with a higher bulk density and a higher percentage of +100 mesh crystals than the use of the anionic surfactant alone.

Anionic surfactants which are capable of being adsorbed on sodium sequicarbonate crystals are organic sulfates, sulfonates and taurates which contain a hydrophobic group. Suitable hydrophobic groups are alkylated phenyl radicals having 8 to 18 alkyl carbon atoms, naphthyl radicals having 4 to 18 alkyl carbon atoms, alkyl radicals having 8 to 22 carbon atoms and

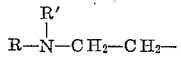

radicals wherein R is an acyl radical of a higher fatty acid having 8 to 22 carbon atoms and R' is an alkyl radical. The alkali metal salts of the anionic surfactant are preferably used but the free acids may also be used. Best results with the free acids are obtained if the oil and the anionic surfactant are mixed together and the mixture is then diluted with a small portion of the saturated aqueous trona solution to form the corresponding sodium salt of the surfactant. However, the free acid form of the anionic surfactant and the oil may be added separately.

Examples of suitable anionic surfactants for the invention are aromatic compounds such as dodecyl benzene sulfonates, polypropylene benzene sulfonates having 10 to 18 alkyl carbons, dibutyl naphthalene sulfonates, diisopropyl naphthalene sulfonates, etc.; alkyl compounds such as octyl sulfates, nonyl sulfates, decyl sulfonates, lauryl sulfates, coconut alcohol sulfates, tridecyl alcohol sulfates, tallow alcohol sulfates, cetyl sulftaes, oleyl sulfates, etc.; N-alkyl-N-actyl taurates, N-cyclohexyl-N-palmityl taurates, N-methyl taurates of tallow acids, N-methyl-N-oleyl taurates, etc.

Examples of suitable hydrocarbon oils for use in the invention are aliphatic hydrocarbons having 10 to 22 carbon atoms such as dodecane, cetane, heptadecane, octadecane, etc., aromatic hydrocarbons such as naphthalene; petroleum oils such as gasoline, diesel oil, kerosene, burner fuels, lubricating oil; natural oils such as neat's-foot oil, mineral oil, etc.

While we do not intend to be limited to any theory for the improved results of the invention, the following theoretical discussion is one way of explaining the phenomenon.

Brown (Acta Cryst., vol. 2, 1949, p. 167) determined from X-ray diffraction data that sodium sesquicarbonate crystals are formed by connection of the planar carbonate radicals. The anionic surfactants of the invention have radicals such as a sulfonate radical which are similar in size to the carbonate ion in the sodium sesquicarbonate crystal lattice and can therefore replace a carbonate ion in the sodium sesquicarbonate crystal lattice. The anionic surfactants may be constantly adsorbing and desorbing in a dynamic fashion on the sesquicarbonate crystals.

The anionic surfactant is believed to improve the particle size distribution by inhibiting the growth of crystal nuclei, and at the same time to produce short sturdy needles instead of long, fragile crystals by inhibiting growth on needle ends of the crystals. To inhibit nucleus growth, it is postulated that a sulfonate, sulfate or taurate radical replaces a carbonate radical in the nucleus and that the remainder of the sufonate envelopes the nucleus and inhibits further carbonate groups from depositing thereon.

It is postulated that the anionic surfactants are more strongly absorbed on the ends of crystals than the "sides" and that the absorbed surfactant prevents deposition of carbonate groups on the ends causing the sodium sesquicarbonate crystals to grow sidewise. This would account for the shorter crystals obtained with the anionic surfactant modifier.

The oil present in the trona solution with the anionic surfactant also is believed to be concentrated at the crystal surface and offers increased resistance to the growth of new nuclei or to growth on the needle ends of the crystals. The oil is concentrated at the crystal surface either by attraction to the anionic surfactant deposited thereon or it forms an oil-in-water emulsion with the anionic surfactant present at the oil-water interface. As stated above, the foregoing is merely a theoretical explanation of the oil-surfactant additives on sodium sesquicarbonate crystal growth and the invention is not intended to be limited thereto.

To demonstrate that sodium sesquicarbonate crystals prepared from trona solutions containing a mixture of an anionic surfactant and oil have a higher bulk density and a greater percentage of +100 mesh crystals than sodium sesquicarbonate crystals prepared from trona solution containing the anionic surfactant per se, the following test was conducted.

In a plant test a crystallizer feed was used that contained approximately 14 p.p.m. of sodium dodecyl benzene sulfonate and no oil additive. Another test was run in which 14 p.p.m. of sodium dodecyl benzene sulfonate and 2.5 p.p.m. of diesel fuel were added to the crystallizer feed. The sodium sesquicarbonate crystals formed in the crystallizers in each test were calcined to soda ash and the average bulk density and the average mesh percentages were compared. The results are summarized in Table I.

TABLE I

| Additive | Average Bulk Density | Average percent | | |
|---|---|---|---|---|
| | | +30 mesh | +40 mesh | +100 mesh |
| 14 p.p.m. sodium dodecyl benzene sulfonate | 47.2 | 0.6 | +6.8 | 83.6 |
| 14 p.p.m. sodium dodecyl benzene sulfonate and 2.5 p.p.m. of diesel fuel | 49.7 | 1.9 | 16.0 | 89.2 |

The sodium sesquicarbonate crystals from each test were compared. The crystals produced from the trona solution containing the dodecyl benzene sulfonate and diesel oil were elongated along the $a$ axis and had nearly square ends while the crystals from the other test in which only dodecyl benzene sulfonate was used were elongated along the $c$ axis and had poor uneven ends.

To further illustrate the increase in the bulk density and the amount of +100 mesh crystals of sodium sesquicarbonate when using the oil-surfactant mixture of the invention, actual plant tests were made with diesel oil having a boiling range of 196 to 323° C. and with sodium dodecyl benzene sulfonate as the anionic surfactant. The mixture was added to the trona solutions before crystallization. The results of the tests are summarized in Table II.

TABLE II

| Weight Ratio of Surfactant to Diesel Oil | Surfactant+ Diesel Oil Concentration In Crystallizer feed, p.p.m. | Duration of Test | Soda Ash Average Bulk Density, lb./ft.³ | Soda Ash Average Partial Size Percent+ 100 mesh |
|---|---|---|---|---|
| 3:1 | 20 | 4 days | 48.3 | 88.1 |
| 6:1 | 18 | 24 days | 48.6 | 89.1 |
| 3:1 | 20 | 12 days | 48.8 | 86.4 |
| 6:0 | 15 | 3 months | 47.2 | 81.6 |

The crystal data in Table II is based on soda ash rather than sodium sesquicarbonate since the latter is usually calcined to soda ash which is the more valuable commercial product. The changes in the sodium sesquicarbonate crystals are reflected in the soda ash data since the quality of the soda ash depends directly upon the quality of the sodium sesquicarbonate crystals.

Table III illustrates the crystal size of sodium sesquicarbonate crystals at varying ratios of sodium dodecyl benzene sulfonate to diesel oil. The table shows that good results are obtained at ratios of sulfonate to oil between 1:2 to 8:1 but that the best results are obtained between 1.5:1 and 4:1.

TABLE III

| Weight Ratio of Surfactant to Oil | Surfactant+ Diesel Oil Concentration In Crystallization Solution, p.p.m. | Percent Crystal Size | | |
|---|---|---|---|---|
| | | +60 mesh | +100 mesh | −100 mesh |
| 1:2.5 | 140 | 68.4 | 85.9 | 14.1 |
| 1:1 | 90 | 75.8 | 89.5 | 10.5 |
| 1.5:1 | 65 | 79.7 | 94.5 | 5.5 |
| 2:1 | 60 | 95.0 | 99.3 | 0.7 |
| 4:1 | 50 | 88.8 | 98.9 | 1.1 |
| 8:1 | 45 | 70.2 | 89.8 | 10.2 |

Sodium sesquicarbonate crystals were formed from crystallizer feeds containing various additives and the sodium sesquicarbonate crystals were calcined to soda ash and the average mesh sizes of the crystals were determined. The results are summarized in Table IV.

TABLE IV

| Additive | Average Percent | | | |
|---|---|---|---|---|
| | +40 mesh | +60 mesh | +100 mesh | −100 mesh |
| 1. None | 10.1 | 24.7 | 53.0 | 47.0 |
| 2. 40 p.p.m. sodium cetyl alcohol sulfate | 16.5 | 32.5 | 66.9 | 33.1 |
| 3. 40 p.p.m. sodium cetyl alcohol sulfate and 25 p.p.m. diesel oil | 34.8 | 65.5 | 87.2 | 12.8 |
| 4. 75 p.p.m. isopropyl naphthalene sodium sulfonate | 50.4 | 84.6 | 96.2 | 3.8 |
| 5. 40 p.p.m. isopropyl naphthalene sodium sulfonate and 25 p.p.m. diesel oil | 62.8 | 88.9 | 97.7 | 2.3 |
| 6. 40 p.p.m. dodecyl benzene sulfonic acid | 73.2 | 86.8 | 96.5 | 3.5 |
| 7. 40 p.p.m. dodecyl benzene sulfonic acid and 25 p.p.m. diesel oil | 87.5 | 93.9 | 97.9 | 2.1 |
| 8. 100 p.p.m. alkyl aryl sodium sulfonate | 21.2 | 72.8 | 94.7 | 5.3 |
| 9. 40 p.p.m. alkyl aryl sodium sulfonate and 25 p.p.m. diesel oil | 54.5 | 86.2 | 95.4 | 4.6 |
| 10. 40 p.p.m. triethanolamine lauryl sulfate | 23.2 | 35.2 | 61.1 | 38.9 |
| 11. 40 p.p.m. triethanolamine lauryl sulfate and 25 p.p.m. diesel oil | 26.7 | 52.3 | 82.3 | 17.7 |

As can be easily seen from Table IV, the use of an anionic surfactant and an oil as crystallization additives give larger crystals of soda ash than the use of the anionic surfactant alone.

To illustrate the beneficial results obtained from various oils, crystallizer feeds containing 40 p.p.m. of sodium dodecyl benzene sulfonate as the anionic surfactant and 50 p.p.m. of various oils were used to form sodium sesquicarbonate crystals which were calcined to soda ash. The soda ash was screened and compared to a standard sample in which only 40 p.p.m. of sodium dodecyl benzene sulfonate was added to the crystallizer feed. The results are summarized in Table V.

TABLE V

| Additive | Average Percent | | | |
|---|---|---|---|---|
| | +40 mesh | +60 mesh | +100 mesh | −100 mesh |
| Sodium dodecyl benzene sulfonate | 50.8 | 74.7 | 90.6 | 9.4 |
| Sodium dodecyl benzene sulfonate and diesel fuel | 87.9 | 94.7 | 97.3 | 2.7 |
| Sodium dodecyl benzene sulfonate and kerosene | 80.2 | 95.0 | 99.1 | 0.9 |
| Sodium dodecyl benzene sulfonate and lube oil | 68.0 | 86.5 | 95.0 | 5.0 |
| Sodium dodecyl benzene sulfonate and mineral oil | 60.9 | 83.7 | 94.9 | 5.1 |
| Sodium dodecyl benzene sulfonate and gasoline | 68.4 | 86.7 | 95.9 | 4.1 |
| Sodium dodecyl benzene sulfonate and petroleum jelly | 64.1 | 83.6 | 92.8 | 7.2 |

Various modifications of the process of the invention may be made without departing from the spirit or scope thereof and it is to be understood that the invention is to be limited only as defined in the appended claims.

We claim:
1. A process for the preparation of sodium sesquicarbonate crystals having a high bulk density and a high percentage of +100 mesh crystals which comprises crystallizing sodium sesquicarbonate from a saturated aqueous trona solution in the presence of about 5 to 400 parts per million of a mixture of an anionic organic surfactant capable of adsorbing on sodium sesquicarbonate crystals and a hydrocarbon oil containing essentially only hydrogen and carbon having a boiling point of about 80° C. to about 400° C., the weight ratio of surfactant to oil being about 1:1 to 20:1 provided that the oil concentration is at least 2.5 p.pm., and recovering the sodium sesquicarbonate crystals.

2. The process of claim 1 wherein the ratio of surfactant to oil is 2:1 to 4:1.

3. The process of claim 1 wherein the anionic surfactant is selected from the group consisting of organic sulfates, sulfonates and taurates possessing a hydrophobic group and a hydrocarbon oil containing essentially only hydrogen and carbon having a boiling point of about 80° to 400° C., the weight ratio of anionic surfactant to oil being about 1:1 to about 20:1 provided that the oil concentration is at least 2.5 p.p.m.

4. The process of claim 3 wherein the anionic surfactant is selected from the group consisting of alkyl phenyl sulfonates and alkyl phenyl sulfates having 8 to 18 alkyl carbon atoms.

5. The process of claim 3 wherein the anionic surfactant is selected from the group consisting of alkyl naphthyl sulfates and alkyl naphthyl sulfonates having 4 to 18 alkyl carbon atoms.

6. The process of claim 3 wherein the anionic surfactant is selected from the group consisting of organic sulfates and sulfonates containing the radical

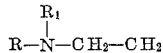

wherein $R_1$ is an alkyl radical having 8 to 22 carbon atoms and R is an acyl radical of a higher fatty acid having 8 to 22 carbon atoms.

7. The process of claim 3 wherein the hydrocarbon oil is an aliphatic hydrocarbon having 10 to 22 carbon atoms.

8. The process of claim 3 wherein the hydrocarbon oil is an aromatic hydrocarbon.

9. The process of claim 3 wherein the hydrocarbon oil is a petroleum oil.

10. The process of claim 1, wherein the crystallization from the saturated aqueous trona solution is in the presence of about 5 to about 400 parts per million of a mixture of sodium dodecyl benzene sulfonate and diesel oil, the weight ratio of sulfonate to oil being 1:1 to 20:1 provided that the oil concentration is at least 2.5 p.p.m.

11. The process of claim 10 wherein the ratio of sulfonate to oil is 2:1 to 4:1.

12. The process of claim 1, wherein the crystallization from the saturated aqueous trona solution is in the presence of about 5 to about 400 parts per million of a mixture of sodium alkyl naphthalene sulfonate having 4 to 18 alkyl carbon atoms and diesel oil, the weight ratio of said sulfonate to diesel oil being 1:1 to 20:1 provided that the oil concentration is at least 2.5 p.p.m.

13. The process of claim 1, wherein the crystallization from the saturated aqueous trona solution is in the presence of about 5 to about 400 parts per million of a mixture of sodium cetyl alcohol sulfonate and diesel oil, the weight ratio of said sulfonate to diesel oil being 1:1 to 20:1 provided that the oil concentration is at least 2.5 p.p.m.

14. The process of claim 1, wherein the crystallization from the saturated aqueous trona solution is in the presence of about 5 to about 400 parts per million of a mixture of sodium methyl oleoyl taurate and diesel oil, the weight ratio of said taurate to diesel oil being 1:1 to 20:1 provided that the oil concentration is at least 2.5 p.p.m.

15. The process of claim 1, wherein the crystallization from the saturated aqueous trona solution is in the presence of about 5 to about 400 parts per million of a mixture of sodium alkyl naphthalene sulfonate having 4 to 18 alkyl carbon atoms and white mineral oil, the weight ratio of said sulfonate to white mineral oil being 1:1 to 20:1 provided that the oil concentration is at least 2.5 p.p.m.

16. The process of claim 1, wherein the crystallization from the saturated aqueous trona solution is in the presence of about 5 to about 400 parts per million of a mixture of sodium lauryl sulfate and dodecane, the weight of said sulfate and dodecane being 1:1 to 20:1 provided that the oil concentration is at least 2.5 p.p.m.

17. The process of claim 1, wherein the crystallization from the saturated aqueous trona solution is in the presence of about 5 to about 400 parts per million of a mixture of alkyl phenyl sulfonic acid having 8 to 18 alkyl carbon atoms and diesel oil, the weight ratio of said sulfonic acid to diesel oil being 1:1 to 20:1 provided that the oil concentration is at least 2.5 p.p.m.

18. The process of claim 1, wherein the crystallization from the saturated aqueous trona solution is in the presence of about 5 to about 400 parts per million of a mixture of tridecyl benzene sulfonic acid and diesel oil, the weight ratio of said sulfonic acid to diesel oil being 1:1 to 20:1 provided that the oil concentration is at least 2.5 p.p.m.

19. A process for the preparation of sodium sesquicarbonate crystals having a high bulk density and a high percentage of +100 mesh crystals, which comprises crystallizing sodium sesquicarbonate from a saturated aqueous trona solution in the presence of about 5 to 400 parts per million of a mixture of an anionic organic surfactant capable of adsorbing on sodium sesquicarbonate crystals and neatsfoot oil, the weight ratio of surfactant to oil being about 1:1 to 20:1, provided that the oil concentratration is at least 2.5 p.p.m. and recovering the sodium sesquicarbonate crystals.

References Cited by the Examiner

UNITED STATES PATENTS

| | | | |
|---|---|---|---|
| 1,766,705 | 6/1930 | Dehnel | 23—64 |
| 2,226,101 | 12/1940 | Ogden | 23—300 |
| 2,273,722 | 2/1942 | Muskat et al. | 23—300 |
| 2,440,378 | 4/1948 | Newsome et al. | 23—300 |
| 2,954,282 | 9/1960 | Bauer et al. | 23—300 |
| 3,037,849 | 6/1962 | Frint et al. | 23—302 X |
| 3,072,466 | 1/1963 | Bauer et al. | 23—300 |
| 3,084,026 | 4/1963 | Frint | 23—38 |

FOREIGN PATENTS 748,443  5/1956  Great Britain.

OTHER REFERENCES

Schwartz et al., Surface Active Agents, 1949 Inter-Science Publishers, New York, pages 233 to 237.

NORMAN YUDKOFF, *Primary Examiner*.